April 25, 1961 P. M. LUCAS ET AL 2,981,802

REMOTE LINE CONCENTRATOR

Filed Dec. 29, 1958 4 Sheets-Sheet 1

April 25, 1961 P. M. LUCAS ET AL 2,981,802

REMOTE LINE CONCENTRATOR

Filed Dec. 29, 1958 4 Sheets-Sheet 2

REMOTE LINE CONCENTRATOR

Filed Dec. 29, 1958 4 Sheets-Sheet 3

April 25, 1961 P. M. LUCAS ET AL 2,981,802

REMOTE LINE CONCENTRATOR

Filed Dec. 29, 1958 4 Sheets-Sheet 4

United States Patent Office
2,981,802
Patented Apr. 25, 1961

2,981,802

REMOTE LINE CONCENTRATOR

Pierre M. Lucas, 11 Rue Abbe Derry, Issy-les-Moulineaux, and Auguste A. Sautel, 13 Rue Anatole France, Bonneuil-sur-Marne, France Filed Dec. 29, 1958, Ser. No. 783,390

Claims priority, application France Jan. 4, 1958

4 Claims. (Cl. 179—18)

The present invention relates to a telephone traffic concentrator operating in conjunction with a completely electronic central station and permitting a certain number of subscribers to be connected to this central station by means of a more limited number of trunk lines.

This concentrator constitutes a separate unit placed in the neighborhood of the centre of gravity of the geographical distribution of the subscribers which it can serve.

It is connected, by two-wire lines, to a certain number of subscriber stations, for example fifty, and to the central station by a number of trunk lines which is less than the number of subscribers, for example ten.

Traffic concentration units are known (see, for example, the U.S. patent application Ser. No. 688,196, dated October 4, 1957, now Patent No. 2,925,473, issued February 16, 1960, of the present applicant first named for a "Remote Line Concentrator") the principle of which consists in assigning to each of the subscribers which are connected to them a time position in a recurrent cycle the total duration of which is, for example a hundred milliseconds.

This recurrent cycle is divided into as many major cycles as there are subscribers connected to a concentrator, these major cycles having, for example, a duration of two milliseconds if there are fifty subscribers per concentrator, and being characteristic respectively of the subscribers No. 00, subscribers No. 01, subscribers No. 02, etc. . . . to the subscribers No. 49 of the concentrators. Each of the fifty major cycles is in turn divided into as many minor cycles as there are concentrators connected to the central station, these minor cycles having for example, a duration of twenty microseconds if there are a hundred concentrators and being characteristic of the first, second, etc. . . . to the hundredth concentrator.

As a result a minor cycle constitutes a position in time which is characteristic of a given subscriber of the central station, the number of this minor cycle determining the concentrator and the number of the major cycle to which it belongs determining the number of the subscriber in the concentrator to which he is connected. Thus to the subscriber No. 02 of the concentrator No. 5 there will be assigned, in the concentrator, the time position represented by the third major cycle and, in the central station, the time position represented by the fifth minor cycle of this third major cycle.

This division of time into major cycles corresponding to the numbers of the subscribers in the concentrator enables a time definition which is fairly uncritical to be maintained in the latter and does not necessitate the use of pulses of very short duration at its level, the fine definition being carried out in the central station switching net-work itself, the circuits of which can be more easily supervised.

The concentrators of the prior art essentially comprise a rectangular matrix of crosspoints, a subscriber-identification pulse distributor synchronized with the rate of operation of the central station and distributing these subscriber-identification pulses to the time positions of the major cycles on a group of fifty circuits generally designated "gates," each assigned to a given subscriber of the concentrator. The operation of these gates essentially consists in allowing pulses and signal frequencies to pass or in blocking them according to the service condition of the subscriber's line.

In these concentrators of the prior art, the gate circuits of the subscribers' equipments in the concentrator comprise three inputs and one output. The first input is connected to the subscriber's line; the second input to the terminal of the subscriber-identification pulse distributor which is assigned to the subscriber in question; the third input to a common source of a signal of a special frequency known as the "loop frequency." The output is connected to the matrix of crosspoints.

The gate circuits can have four distinct states according to the service condition of the subscriber's line.

In the first state corresponding to an idle line, the gate circuit allows the subscriber-identification pulses which are supplied by the pulse distributor, to pass with a certain amplitude; during the second state, corresponding to a subscriber's line looped to the subscriber's set and not connected to a trunk line, the gate circuit allows the subscriber-identification pulses to pass with a greater amplitude than before; during the third state, corresponding to a subscriber's line looped to the subscriber's set and connected to a trunk line, the gate circuit allows to pass only the speech signals; during the fourth state, corresponding to a subscriber's line which is not looped to the subscriber's set but which is connected to a trunk line (as in the case of dialing or when the telephone handset has been replaced or when a required subscriber is called) the gate circuit allows the signal at the loop frequency to pass.

More particularly, when a subscriber lifts his handset (service condition: loop closed and not connected) the microphone supply current which circulates in the line modifies the characteristics of the gate which is assigned to him in such a manner that pulses of large amplitude, called unilateral connection pulses and derived from subscriber-identification pulses provided by the pulse distributor, can be transmitted in the direction of the matrix of crosspoints. These unilateral connection pulses have for effect to cause one of the crosspoints associated with the subscriber's line to be brought into operation, that is to say the connection of the subscriber to one of the trunk lines leading to the central station.

The operation of the crosspoint (service condition: loop closed and connected) causes a double action: it again modifies the characteristics of the subscriber's gate in such a manner that all the signals in the direction of the central station are blocked and in addition it causes the transmission over the corresponding trunk line to the central station of a pulse called the connection control pulse which allows the central station, by analysis of the time of occurrence of this pulse, to determine the number of the subscriber's line which has just been connected in the concentrator and to connect the trunk line which has just been engaged to a registering device. The trunk line equipment in the central station then transmits to the subscriber the dialing tone to invite him to dial the number.

When the subscriber operates his dial (service condition: loop open and connected) he causes rhythmically occurring breaks in the loop formed by his line; the interruption of the microphone supply current causes, in step, modifications of the characteristics of his gate which are such that, during the period of breaking of the loop, the signal at the loop frequency is transmitted through the matrix of crosspoints and over the chosen trunk line in the direction of the central station. This signal at the loop frequency, analyzed by the trunk line equipment in the central station, enables this latter to record the operations of the subscriber.

When the subscriber replaces his handset at the end of the call (service condition: loop open and connected), the same signal at the loop frequency is transmitted and analyzed in the same manner by the central station. After a certain delay, this latter, recognizing that it indicates a replacement of the handset, frees the connection by sending to the concentrator pulses which are called disconnection pulses.

When the central station has received the number of digits required to establish the connection between the incoming trunk line and an outgoing trunk line, it proceeds to effect this connection by methods well known to one skilled in the art. The calling subscriber can hear all the tones which inform him of the result of his call such as an audible ringing tone, a busy tone, automatic announcers, etc. and finally can enter into conversation with the called subscriber when the latter lifts his handset.

Once the line is freed, the characteristics of the subscriber's gate are again modified and an "idle" condition obtained (service condition: loop open and disconnected). In this condition, the gate allows the passage in the direction of the matrix of crosspoints of pulses of small amplitude, which are known as bi-lateral connection pulses and come from the identifying pulse distributor and which are situated in the time position characteristic of the subscriber's line in his concentrator. These pulses, the amplitude of which is about half of that of unilateral connection pulses are insufficient in themselves to unblock the crosspoints associated with the subscriber's line. These pulses in synchronism with other bi-lateral connection pulses of the same kind but of opposite polarity transmitted by the central station over the two wires in parallel of a given trunk line, serve to effect the connection of a given subscriber's line for the incoming calls.

The object of the present invention is to provide a concentrator of the kind considered in which the trunk lines transmit only signals of relatively low frequencies with the exception of short pulses, all the pulse signals being transmitted between the concentrator and the central station through auxiliary channels.

The result is that:

(1) The connection control signals transmitted between the concentrator and the central station and the disconnection signals transmitted between the central station and the concentrator, hitherto transmitted in the form of short pulses, at video frequency, are now transmitted in the form of pulses containing several cycles of a sinusoidal signal of characteristic frequency;

(2) The switching signals of a called subscriber, hitherto known as bi-lateral signals and transmitted over all the free trunk lines of the central station to the concentrator, are now transmitted through a supplementary two-wire control line.

Another object of the invention is to provide a concentrator of the kind considered in which the subscriber's gates include, instead of two saturable core transformers, transistor coincidence circuits.

Another object of the invention is to provide a concentrator of the kind considered in which the connection of the line of a called subscriber to any free trunk line is made in the same manner as the connection of this same subscriber's line to a free trunk line when the subscriber is calling.

Consequently while in the concentrators described in the application previously mentioned, the connection of a called subscriber was effected by applying before and after the rectangular matrix of crosspoints pulses of different polarity which were coincidental in time, provided the one by the subscriber-identification pulse distributor and the other by the central station in the time position characteristic of the called subscriber, and the sum of the amplitudes of which was sufficient to render conducting a crosspoint, in the concentrators of the present invention there is applied to a coincidence circuit situated before the rectangular matrix of crosspoints simultaneously subscriber-identification pulses and a pulse in the time position which is characteristic of the called subscriber.

Other objects and characteristics of the invention will appear from the detailed description which will now be given of a non-limiting example of embodiment and by referring to the attached drawings, in which.

As in the previously mentioned application, it will be supposed that the concentrator is connected on the one hand to fifty subscribers' two-wire lines and on the other hand to the central station by means of ten two-wire trunk lines. In addition four two-wire control lines also connect the central station to the concentrator, one of them carrying the synchronizing pulses from the subscriber-identification pulse generator, the second the loop frequency signal, the third the connection control frequency signal and the fourth the called subscriber switching pulses.

The phantom circuit effected by means of two of these control lines is used for the remote supply of direct current to the concentrator which is assumed to be situated at some distance from the central station.

Figure 1:
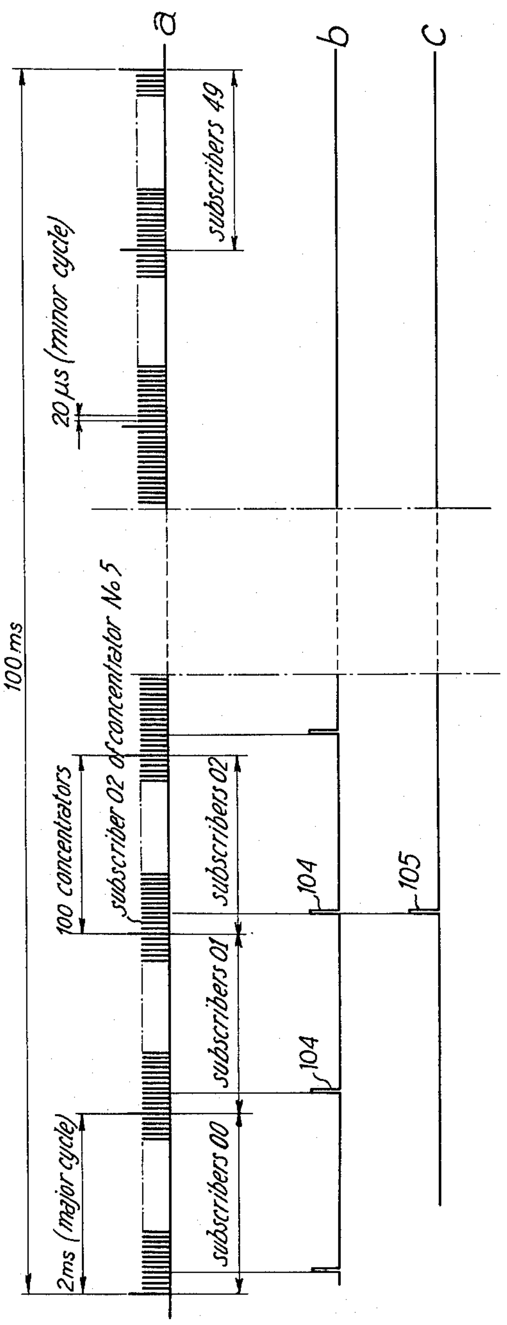
Fig. 1 is a pulse diagram taken from the previously mentioned application which explains the time allocations alloted to the subscribers and to the concentrator.

It will be remembered that the principle of the concentrator is to allot to each of fifty subscribers which are connected to it a time position in a recurring cycle the total duration of which is, for example, a hundred milliseconds. This recurring cycle (Fig. 1) is divided into fifty major cycles each having a duration of two milliseconds and being characteristic respectively of the subscribers No. 00, the subscribers No. 01, the subscribers No. 02, etc. . . . the subscribers No. 49 of the hundred concentrators. Each of these fifty major cycles is in turn divided into a hundred minor cycles having a duration of twenty microseconds and being characteristic of the first, second, etc. . . . hundredth concentration stage.

Figure 2:
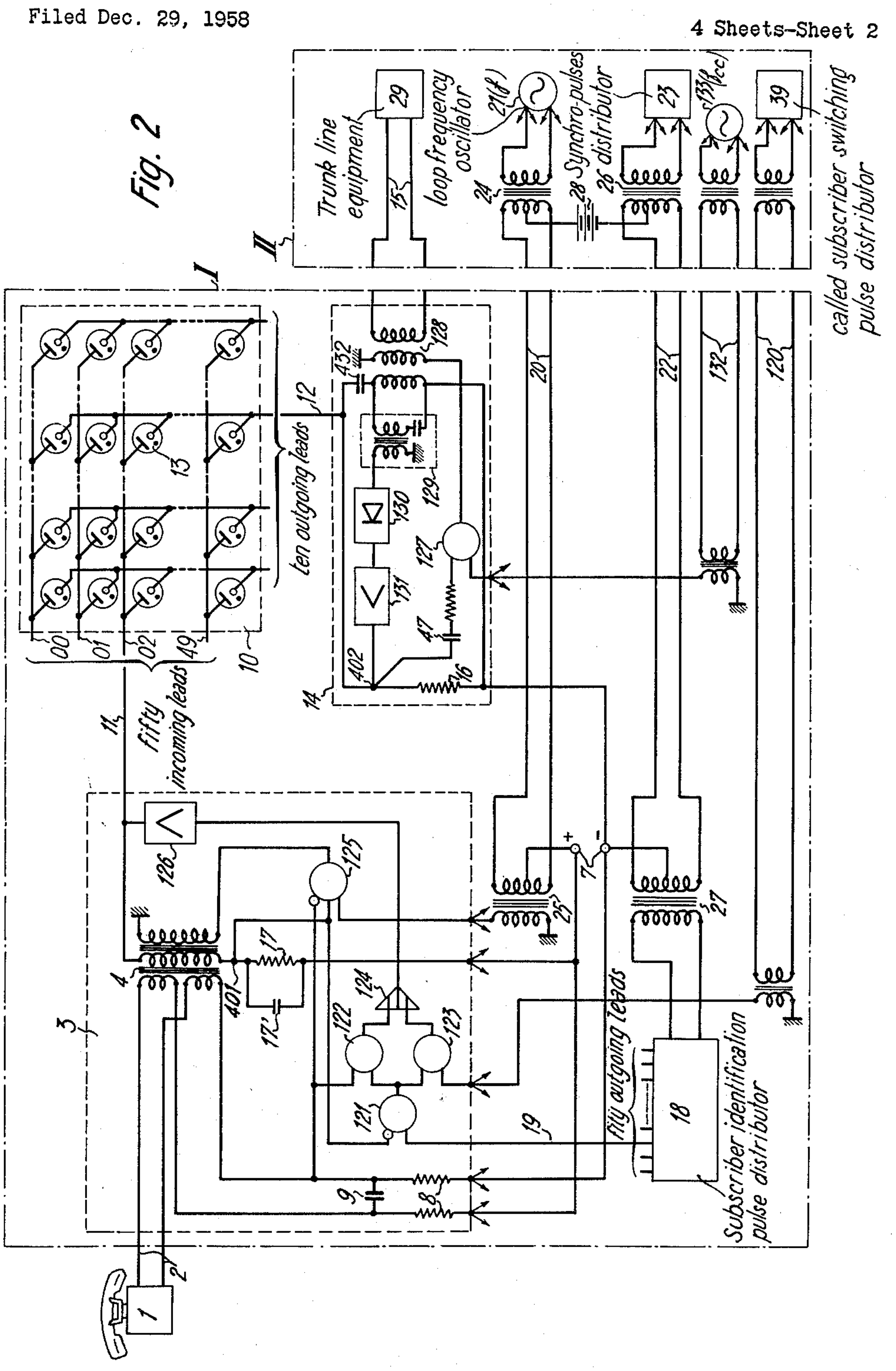
Fig. 2 represents diagrammatically the concentrator in conjunction with a single subscriber's line and a single trunk line.

Referring to Fig. 2, I indicates the concentrator and II the central station. 1 indicates one of fifty subscribers' sets. It will be supposed that the subscriber in question is No. 02 of the concentration stage No. 5. This subscriber's subset 1 is connected by a two-wire line 2 to the primary winding of a low frequency transformer 4 provided in a gate 3 of this subscriber. The supply of microphone current to the subscriber subset is obtained through the phantom remote supply circuit formed by two real circuits 20 and 22, the terminals of which are indicated at 7, through resistors 8. A capacitor 9 completes the circuit for speech frequencies. A rectangular matrix of crosspoints 10 comprises fifty input leads, for example 11, and ten output leads, for example 12. At the crosspoint of the two incoming and outgoing leads there is a connection element 13 of which few are shown in the drawing although there are five hundred in the whole of the rectangular matrix. This crosspoint has been here supposed to be constituted by a cold-cathode gas tube, an element which is now standard in telecommunication techniques, but it will be clear that other devices having similar properties and particularly similar lock-out characteristics could be used. The outgoing leads such as 12 lead to equipments 14 of trunk lines 15 towards the central station, and are finally connected through a load resistor 16 to the negative pole of the remote supply source. It is well known, particularly by the above mentioned United States Patent No. 2,925,473 that gas diodes having a common load impedance, such as cold-cathode gas tubes connected by a given outgoing lead 12 to a resistor 16, block one another and that only one of them can pass to the completely conductive condition.

On the other side, the ingoing leads such as 11 lead on the one hand to a secondary winding of transformer 4 and to resistor-capacitor circuit 17—17′ and on the other hand to pulse amplifier 126. One end of resistor 17 is connected to the positive pole of a remote supply source. Between the two poles of this source there is a circuit which passes through resistor 17, a secondary winding of transformer 4, a crosspoint 13 and resistor 16. When crosspoint 13 becomes conductive the potential of point 401 of this circuit is reduced and the potential of point 402 is increased.

Four two-wire control lines 20, 22, 120 and 132 connect additionally concentrator I with central station II. Control line 20 carries the signal at the loop frequqency $f$ generated by an oscillator 21 which is common to all the concentrators connected to the central station. Control line 22 carries the synchronising pulses provided by pulse generator 88 which is also common to the whole of the central station. As it will be seen later these synchonising pulses are transmitted by pulse distributor 23 to each concentrator with a repetition frequency of 500 cycles per second at such a time that they will coincide with each minor cycle which relates to the concentrator in question, taking in account the time of two-way propagation (outgoing and returning) of pulses between the central station and the concentrator. Transformers 24, 25, 26 and 27 located in control lines 20 and 22 are utilised for the constitution of the phantom remote supply circuit between battery 28 situated in central station II and supply terminals 7 in concentrator I.

Control line 120 carries the called subscriber switching pulses which are produced by unit 39 of the central station which serves for the designation of the called subscriber. Control line 132 carries the connection control signal of frequency $f_{cc}$ which is generated by an oscillator 133 which is common to all the concentrators connected to the central station.

Gate 3 of a subscriber includes a given number of coincidence circuits 121 to 125. Circuit 121 is a coincidence circuit of the "and-not" kind, that is to say a circuit with an inhibiting input which allows to pass the subscriber identification pulses relating to the subscriber in question coming from pulse distributor 18 through a lead 19 with the exception that this circuit 121 is inhibited by the presence of a steady voltage at the terminals of circuit 17—17′.

Circuits 122 and 123 are also coincidence circuits of the "and" type, which serve to allow the subscriber-identification pulse from circuit 121 to pass to the matrix of crosspoints in certain conditions. Circuit 122 allows it to pass in the case when there is a steady voltage at the terminals of resistors 8, that is to say when there is a loop on line 2 of subscriber 1. Circuit 123 allows it to pass when a called subscriber switching pulse reaches control line 120 at the same time as the subscriber-identification pulse. Circuit 124 is an "or" circuit which collects the pulses coming either from circuit 122 or from circuit 123 and transmits them to pulse amplifier 126 which applies to line 11 a switching pulse of sufficient amplitude to cause one of the crosspoints such as 13, connected to this line, to be brought into operation. Circuit 125 is an "and" circuit with an inhibiting input; it has for its purpose to allow the signal of loop frequency coming from common generator 21 to pass when the following conditions are combined; a positive voltage exists at the terminals of circuit 17—17′, showing that one of crosspoints 13 connected to line 11 is in operation, and no voltage exists at the terminals of resistors 8, showing that the loops of the subscriber's line is open (service condition: loop open and connected). This case exists either when the subscriber is calling and dials, causing breaks in his loop, or when the subscriber is called and has not yet replied, or finally when a calling or called subscriber hangs up at the end of the communication.

Equipment 14 of a trunk line situated in the concentrator comprises a low frequency transformer 128 of which the third winding serves for the transmission to the central station over two-wire trunk line 15 of the signal at the connection control frequency provided by common generator 133. The variation of the current at point 402 is differenciated and transmitted, through a condenser 47 in the form of a pulse the duration of which is controlled by the values of elements 16 and 47, to a coincidence circuit 127 which is an "and" circuit serving to allow the signal provided by generator 133 to pass during the period of this pulse. A tuned circuit 129 serves to receive the signal at the disconnection frequency transmitted by the central station over trunk line 15 when it is desired to ensure the return to the rest condition of the crosspoint which is in operation and is then associated with this trunk line. The disconnection signal received by tuned circuit 129 is rectified by a detector 130 and is utilised to actuate a power amplifier 131 which is intended to provide at point 402 the voltage variation of suitable polarity and sufficient amplitude to ensure the disconnection of crosspoint 13 which is in the operational condition.

The trunk lines such as 15 terminate at the central station on an individual trunk line equipment 29 which is described in connection with Fig. 3. Before passing to the description of this figure, which is very similar to that of the same number in the above-mentioned application, a number of conventions used in the drawing will be described:

A rectangle including a median line of separation represents a bi-stable trigger circuit; the reference numeral of this trigger circuit is inserted in the upper half of the rectangle. The trigger circuit is assumed to switch to its corresponding state when an energizing signal arrives by way of the connections terminating on this upper half; the trigger circuit is then assumed to affect the output connections linked with this upper half. When an energizing signal arrives by way of the connections terminating on the lower half, the trigger circuit switches to its other stable state and is then assumed to affect the output connections which are connected to its lower half. A return to the reference stable state is obtained by applying an energizing signal through one of the connections terminating in the upper half of the rectangle.

A gate circuit is represented by a circle on which terminate at least two input connections and from which there may be several output connections. A signal is obtained on the output connections only when there are simultaneously effective signals on the input connections. According to the nature of the input signals, the signal obtained on the output connection or connections can be the common part of two pulses or a sinusoidal signal passing for the period that the control connection transmits an effective signal.

A square including within it a rectifier symbol represents a detector circuit which is tuned to a certain frequency.

The nature of the other rectangles represented in the drawing is explained in the text. These are in general devices belonging to the computing part of the central station and will not be described in detail here.

Figure 3:
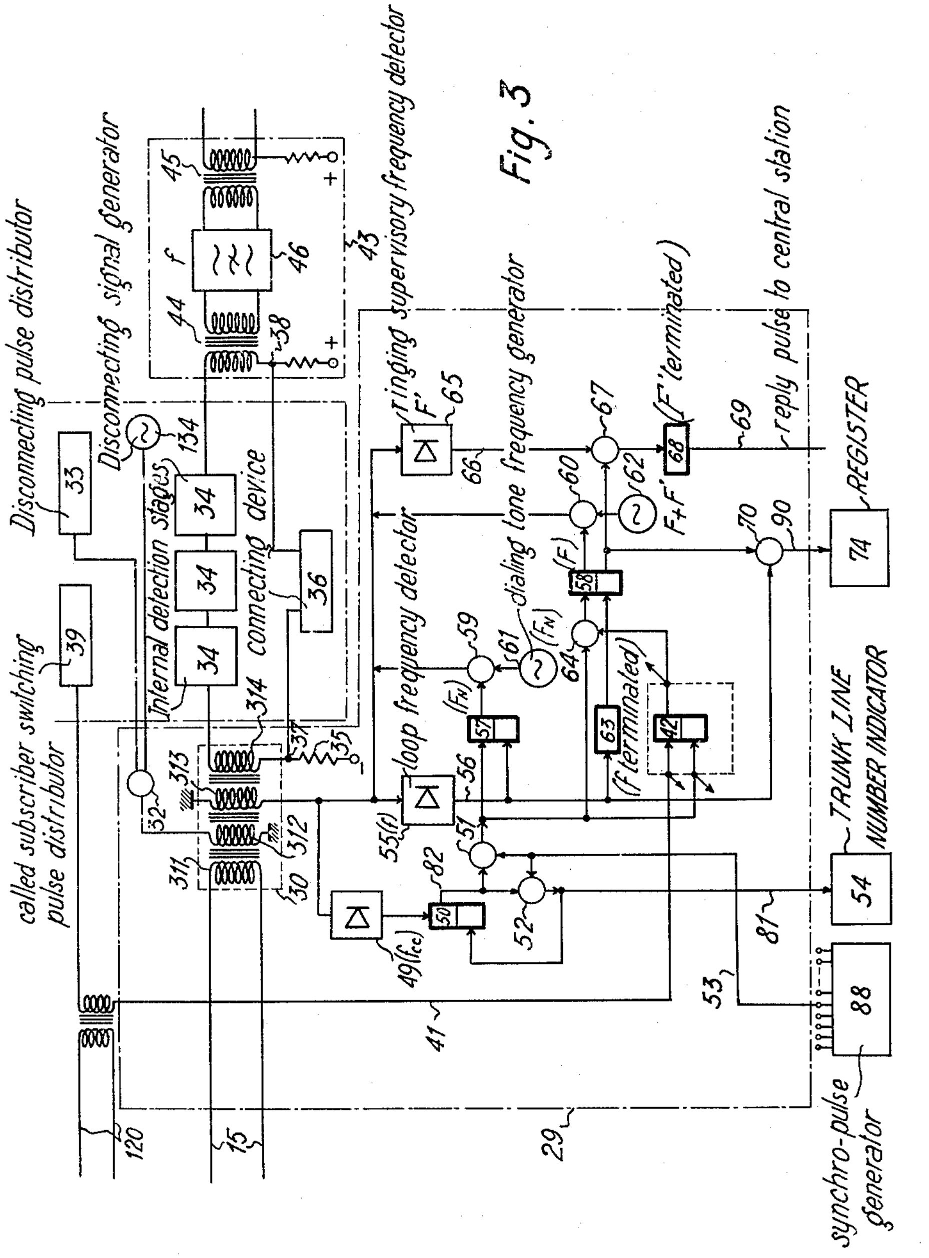
Fig. 3 represents a trunk line equipment situated in the central station, in conjunction with certain parts of the switching network of this central station.

Referring to Fig. 3 equipment 29 of one of ten trunk lines 15 connected to the concentrator comprises a transformer 30 having four windings. Primary winding 311 is connected to trunk line 15. One secondary winding 312 is connected to coincidence circuit 32 which is itself connected to generator 134 of disconnection signals and to generator 33 of disconnection pulses forming part of the inside of the central station. This generator has for its function to transmit, at the control of the central station, disconnecion pulses which cause the disconnection frequency signal to be sent to the concentrator and also cause the connection elements of the internal selection stages of the central station to be returned to the rest condition.

Another secondary winding 313 of transformer 30 is connected to two tuned detectors, the first 49 being at the frequency $f_{cc}$ of the connection control signal and the second 55 being at the frequency $f$ of the loop signal.

Last secondary winding 314 of transformer 30 is connected on the one hand to internal selection stages 34 assumed to be three in number and on the other hand through resistor 35 to the negative pole of the battery.

Rectangle 36 represents the part of the central station which is intended to mark the ends of a path to be connected through the internal selection stages 34 and to cause the connection by applying to the points such as 37 negative connection pulses and to the points such as 38 positive connection pulses.

Rectangle 39 represents the part of the central station which is intended to mark a given concentrator, that which serves for the called subscriber, and to cause at the time position characteristic of this subscriber in his concentrator, the emission of called subscriber switching pulses which will have for effect, in synchronism with the subscriber-identification pulse emitted at that moment by the gate of the subscriber in its idle condition, to cause one of the crosspoints associated with the line of the called subscriber to be brought into operation. The positive pulses emitted by generator 39 are transmitted to the concentrator through control line 120. In addition they are transmitted through a connection 41 to a trigger circuit 42 which is common to the ten trunk line equipments such as 29 of the concentrator. Trigger circuit 42 serves to store the recollection of the fact that a called subscriber switching pulse has just been emitted by the central station in the direction of a subscriber of the concentrator to which he is connected.

A junctor 43 situated between the group of three internal selection stages 34 and the symmetrical group, to which groups it is connected by two transformers 44 and 45, comprises, besides the test devices which are not shown because they take part only in the internal operation of the central station, band-stop filter 46 which prevents signals at the loop frequency $f$ emitted by the gates of the subscribers from being transmitted outside that half of the automatic switching unit with which they are concerned. These frequencies which serve for the supervision of the state of the loop of subscribers must not be mixed.

There will now be described the devices which detect and emit the signals associated with the trunk line equipment 29.

When one of the crosspoints 13 comes into its operational condition in the concentrator it causes the passage of a current of a few milliamperes in leads 11 and 12 in series, and therefore a sharp rise in the potential of point 402 in Fig. 2. Condenser 47 transmits this rise of potential in the form of a control pulse for coincidence circuit 127 which is of the "and" kind. Coincidence circuit 127 also receives the connection control signal of frequency $f_{cc}$ which it allows to pass for the duration of the control pulse. This connection control signal is applied to trunk line 15 through one of the windings of transformer 128. On the exchange side, this signal is received at the terminals of winding 313 of transformer 30 and is detected by first tuned detector 49. The steady voltage thus obtained serves to trigger a trigger circuit 50. In its operational conditions, this trigger circuit unblocks gates 51 and 52 in order to allow subsequently a pulse 104 (Fig. 1) from common generator 88 to pass. Pulse 105 which leaves gate 52 at this moment is on the one hand directed by a lead 81 to scanning device 54 of the type described in connection with Fig. 5 of the above-mentioned application, intended to provide the number of the trunk line, and on the other hand returns to its rest condition trigger circuit 50 thereby again blocking gates 51 and 52. The pulse (also 105) which leaves gate 51 at this moment has several functions one of which is to return to its rest condition common memory trigger circuit 42 in the case when this trigger circuit has been originally switched to its operational condition by the transmission of a called subscriber switching pulse by generator 39.

When a loop frequency signal $f$ from gate 3 of a subscriber connected to trunk line 15 arrives at transformer 30, it is detected by second tuned detector 55 which converts it into a steady voltage on a lead 56.

Two trigger circuits 57 and 58 control respectively, gates 59 and 60, to allow the passage of the dial tone frequency signal $F_N$ produced by a common oscillator 61 and of the ringing frequency signal F and ringing supervision frequency signal F′ both produced by a common generator 62.

Trigger circuit 57 is operated when a pulse 104 produced by generator 88 on lead 53 passes through gate 51 as a result of the presence of a pulse at the output of trigger circuit 50, that is to say at the moment when crosspoint 13 is operated and connects a calling subscriber's line. It is returned to its rest condition when there is a steady voltage on lead 56 as a result of the detection of the loop frequency signal, that is to say either at the first pulse transmitted by the dial of the subscriber or immediately in the case when the connection takes place over a called subscriber line the loop of which is consequently still open. As a result, trigger circuit 57 operated characterizes the connection of a calling subscriber line.

A device 63 which includes a differentiator circuit and a rectifier circuit serves to detect the end of the received loop frequency signal. The differentiator circuit receiving the steady voltage from lead 56 provides, for example, a thin positive pulse at the beginning of the detection of the loop frequency signal and a thin negative pulse at the end; the rectifier circuit removes the positive pulse and allows only the negative pulse at the end to pass.

Trigger circuit 58 is operated by pulse 105 from gate 51, that is to say at the moment when crosspoint 13 is operated provided that gate 64 is open, that is to say when trigger circuit 42 is operated because the line connected is a called subscriber's line.

Thus trigger circuit 58 operated characterizes the connection of a called subscriber's line.

Trigger circuit 58 is reset to rest by the pulse from circuit 63 for detecting the end of the signal at the loop frequency, that is to say at the moment when the called subscriber by lifting his handset stops the transmission of this signal through his gate 3.

The ringing supervisory frequency F′ which is an uninterrupted frequency (having no silent and ringing successive intervals) is transmitted from trunk line equipment 29 connected to the called subscriber through selection stages 34 and the symmetrical group 43 to trunk line equipment 29 connected to the calling subscriber. In this equipment, it is rectified by tuned detector 65 which converts it, like detector 55, into a steady voltage on a lead 66. If trigger circuit 58 is at rest, which obtains in the case of the equipment being connected to the caller, a gate 67 transmits this steady voltage to a circuit 68 which is similar to circuit 63. As a result when the called subscriber replies, the transmission of the frequency F′ through trigger circuit 58 of the trunk line equipment to which he is connected having terminated, the end of the detection of this frequency in the trunk line equipment connected to the calling subscriber will cause on a lead 69 the transmission of a pulse which will be utilised by circuits not shown which concern only the central station and can be used for any suitable purpose, particularly for the charging of the caller.

The steady voltage applied by detector 55 to lead 56 is also sent through a lead 90, by way of a gate 70, to scanning device 74 of the type described in the above-mentioned application and intended to register the number of the called subscriber. Gate 70 is open when trigger circuit 58 is in its rest condition, in other words during the breaks of the loop circuit by the dial of the subscriber and when a calling or called subscriber replaces his handset at the end of the call.

Figure 4:
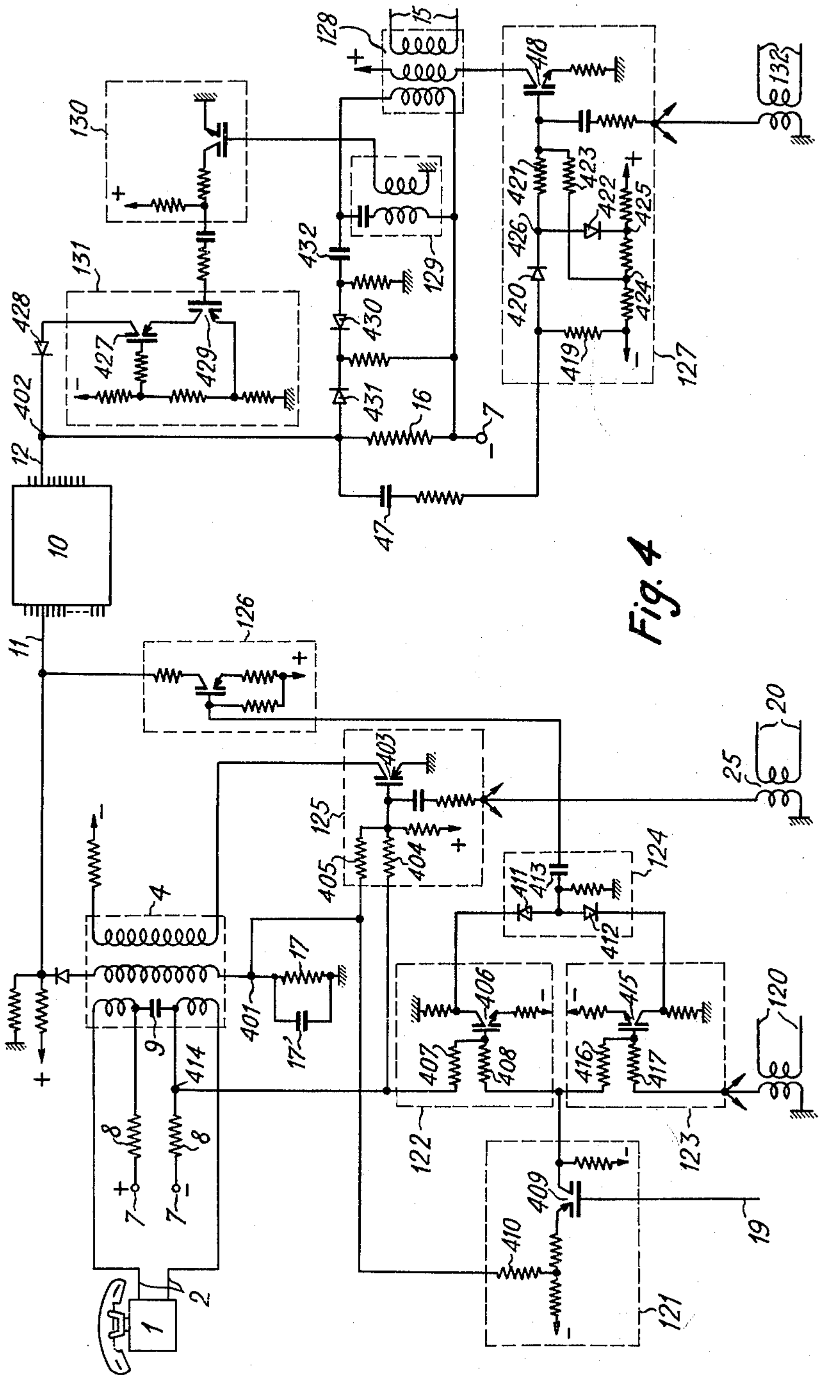
Fig. 4 represents in detail the transistor circuits of the concentrator.

Fig. 4 which shows details of the circuits of the concentrator of Fig. 2, will be explained at the same time as the operation of the concentrator is explained. The signs + and − at the end of a connection indicate that it is connected to terminal 7 of the remote supply having the same polarity. The representation of an earth symbol indicates that the corresponding point is connected to the middle of a load resistor connecting two terminals 7 of the remote supply source.

The detailed operation when a calling operation is begun is as follows:

When subscriber 1 lifts his handset, a direct current flows through loop 2 and creates a change of potential at terminal 414 of one of resistors 8 inserted in this loop. The potential of point 414 increases. This increase of potential applied through resistor 404 to the base of transistor 403 of coincidence circuit 125 blocks this transistor. This same increase of potential applied through resistor 407 to the base of transistor 406 (which is opposite in kind to transistor 403) of coincidence circuit 122 prepares for the unblocking of this transistor, which will become conductive when a subscriber-identification pulse appears on connection 19. This latter impulse which is of negative polarity unblocks transistor 409, thereby increasing the potential of its collector electrode. This increase of potential is transmitted to the base of transistor 406 through resistor 408. During the period of the subscriber-identification pulse, the effects on the base of transistor 406 add to one another and this transistor is unblocked. There results a negative pulse at its collector which is transmitted through diode 411 and capacitor 413 to amplifier 126.

This latter applies to leads 11 a positive pulse. If every trunk line is unavailable, the calling subscriber does not receive the dial-tone signal and has to wait for it before dialing. When a trunk line is available the gas diode situated at crosspoint 13 of the calling subscriber's line with the free trunk line is fired.

This firing causes a reduction of potential at end 401 of resistor 17 which is applied after a certain delay to transistors 403 and 409, respectively, through resistors 405 and 410. In this way the unblocking of coincidence circuit 125 is prepared to occur when the breaks in the loop circuit produced by the dial of the subscriber take place (the potential of point 414 will then become negative) and coincidence circuit 121 is blocked after the passage of the first identification pulse, thus preventing the passage of more than one subscriber identification pulse.

The firing of crosspoint 13 also causes an increase of potential of point 402. The positive pulse obtained is received by the group consisting of resistor 16 and capacitor 47 and is applied to coincidence circuit 127 which is intended to control the passage of the signal at the connection control frequency provided by control line 132, to trunk line 15.

Coincidence circuit 127 includes transistor 418, a potentiometer giving several values of fixed potential, a group of resistors 419, 421 and 423 and diodes 420 and 422. In the absence of a pulse at the terminals of capacitor 47 diodes 420 and 422 are blocked; the base of transistor 418 is at a negative potential (that of point 424) and this transistor is blocked. When a positive pulse (of 20 volts, for example) appears at point 402 capacitor 47 allows a charging current to pass. The potential at the left-hand end of diode 420 increases and diodes 420 and 422 become unblocked. The potential of point 426 becomes equal to that of point 425 (positive) and transistor 418 unblocks and allows the signal at the connection control frequency to pass. When the current through capacitor 47 falls below a certain limiting value, diode 420 again blocks, at the same time as transistor 418.

The function of diodes 420 and 422 is thus to effect a sharp switching which improves the leading edge and the trailing edge of the waveform of the connection control signal.

The signal at the connection control frequency is rectified by tuned detector 49 and finally causes trigger circuit 50 to be operated. The phase difference between the rhythm of pulse generator 88 and the subscriber-identification pulses from distributor 18, taking into account on the one hand the propagation times and on the other hand the average firing periods of gaseous diodes 13, should be such that the triggering of trigger circuit 50 is produced a little before the minor cycle of the concentrator unit which forms part of the major cycle of the subscriber in question, but after the same minor cycle forming part of the preceding major cycle. The margin of adjustment which is thus a little less than 2 milliseconds is very large for electronic devices. In particular, it allows the central station to be prepared for recording the identity of the calling subscriber and of the trunk line of its connecting concentrator. The details of these preliminary operations extends beyond the scope of the present invention.

When the minor cycle characteristic of the concentrator is reached, pulse generator 88 provides a concentrator identification pulse 104 on wire 53. This pulse passes through gates 51 and 52 which are open and produces three effects: it releases trigger circuit 57 which opens gate 59 to the signal at the dialing tone frequency $F_N$ which is heard by the subscriber; it passes by way of wire 81 and through diode decoder 54 and switches to the operational condition one or more of the trigger circuits included within this decoder in such a manner as to register the number of the trunk line of the concentrator which has served to effect the connection, and finally it returns to its rest condition trigger circuit 50 which has for effect to close gates 51 and 52 once again. When the subscriber operates his dial, each break in the loop by opening coincidence circuit 125 allows the passage of the signal at the loop frequency $f$ through crosspoint 13, unblocked diodes 431 and 430, transformer 128 and trunk line 15. This signal at the loop frequency received by secondary winding 313 of transformer 30 is rectified by detector 55 and converted into a steady voltage on lead 56. The beginning of the first pulse received returns to its condition trigger circuit 57 and stops the emission of the dialing tone by closing gate 59.

Gate 70 being open since trigger circuit 58 is in its rest condition, the steady voltage is applied to lead 90 and is consequently available for analysis by the central station by means of scanning device 74 which serves to analyse the number of the called subscriber.

When the central station decides that the number composed by means of the dial has been completely received and that it has the necessary elements for establishing the connection, it sends a busy tone to the calling subscriber if the called subscriber is busy or proceeds to effect the connection of the idle called subscriber through a trunk line of the concentrator of this called subscriber as will be seen later; then, having recognised the number of the chosen trunk line on the called side, it proceeds to connect two groups 34 of internal selection stages by means of marking and connecting device 36 the detailed description of which falls outside the scope of the present invention.

The calling subscriber can then hear, through the chain which has been established, the ringing frequency F emitted by trunk line equipment 29 on the called side. Simultaneously his own trunk line equipment rectifies by means of tuned detector 65 the ringing supervisory frequency F′ and transmits it through gate 67, which is open since trigger circuit 58 is in its rest condition, to device 68.

When the ringing supervisory frequency F′ signal ceases as a result of the lifting of the handset of the called subscriber, device 68 applies to wire 69 a pulse which will be called the reply pulse and which is utilised by the central station for any useful purposes, in particular for indicating the beginning of the charged period of intercommunication, to count the effective traffic, etc.

The retransmission of the supervision of the called subscriber's reply is of interest for a number of reasons, notably to allow the charging operations to be easily associated with the calling subscriber's line without necessitating the storage in a memory device of the relation established between the two subscribers and also when the incoming line is constituted by interurban circuit to retransmit the supervision easily to the calling exchange which must carry out these charging operations.

When the subscriber replaces his receiver at the end of the call, the breaking of his loop causes the same series of operations as when the loop is broken as a result of operation of the dial and the central station is provided in the same manner with means for testing the replacement of the receiver. It distinguishes a receiver hanging up from a dialing pulse by ascertaining, by means of a delay system which is not described here, whether the supervision which is received has a duration greater than 200 milliseconds, for example.

When the central station, by testing the presence of an informatoin signal of sufficient duration on lead 90 ascertains that the subscriber has hung up and decides to free the line, it transmits, by means of pulse distributor 33, a disconnecting pulse over the particular lead terminating at coincidence circuit 32 of the trunk line equipment in question, which disconnecting pulse opens coincidence circuit 32 and allows the disconnecting signal provided by generator 134 to travel to winding 312 of transformer 30 and trunk line 15. The disconnection signal energizes tuned circuit 129, is rectified by detector 130 and amplified by amplifier 131 formed by two transistors 427 and 429. There is thus obtained at the output of this amplifier a positive pulse of sufficient amplitude, when applied to point 402, to extinguish crosspoint 13. The purpose of diode 428 is to prevent transistor 427 from being unblocked during the period of speech. During this period the potential of point 402 is in fact greater than the potential of the base of 427 and without the presence of diode 428 the speech channel would be shunted by two transistors 427 and 429, rendered conductive.

The detailed operation in the case of an incoming call is as follows:

The automatic switching unit having collected all the necessary information to locate the position of the called line, and in particular the number of the concentrator on which it depends, waits until the arrival of the major cycle corresponding to the number of the subscriber in his concentrator and then transmits by means of pulse distributor 39 a called subscriber switching pulse over control line 120 relating to the concentrator in question. This pulse has two functions: it switches to its condition of operation memory trigger circuit 42 associated with the concentrator, and which has for its purpose to store the information that the connection control signal which is to be detected relates to a called subscriber; and also it is applied to coincidence circuit 123 through control line 120. As at this moment a subscriber-identification pulse is present on conductor 19, this pulse and the called subscriber connection pulse, which are applied to the base of transistor 415 through resistors 416 and 417 respectively, render this base positive, resulting in the unblocking of transistor 415 for the period which is common to the subscriber-identification pulse and the called subscriber connection pulse. As a consequence a negative pulse appears on the collector of 415 and passes through diode 412, is amplified by amplifier 126 and applied to lead 11.

If the called subscriber's line is busy, the subscriber identification pulse present on lead 19 is not applied by transistor 409 to the base of transistor 415 which consequently remains blocked. In these conditions the central station sends a busy tone to the calling subscriber.

As in the case of the removal of the handset of a calling subscriber, the firing of a crosspoint 13 reduces the potential of point 401, but with the difference in this case that the potential of point 414 is very negative since the idle called subscriber loop is open. The base of transistor 403 is negative; this transistor is unblocked and allows the loop frequency signal to pass.

Thus there are received simultaneously at the trunk line equipment of the central station the signal at the connection control frequency and the signal at the loop frequency. The first of these signals causes the same operations for identifying the number of the selected trunk line and the central station can thus ascertain the two terminal points of the connection to be effected between trunk line equipments. It proceeds to effect this connection as has been seen above.

However, the effects of the operation of trigger circuit 50 within the trunk line equipment are slightly different from those which occur in the case of the connection of a calling line. Pulse 105 transmitted through gate 51 cannot switch trigger circuit 57 to its operational condition since this latter is maintained in its rest condition by the steady voltage present on wire 56 as a result of the rectification of the loop frequency signal by detector 55. This pulse can, on the other hand, pass through gate 64 which has been opened by memory trigger circuit 42 and switches trigger circuit 58 to its condition of operation; simultaneously it causes trigger circuit 42 to be returned to its rest condition and, after a very short time, the closing of gate 64.

Trigger circuit 58 when in its condition of operation opens gate 60 to the passage of the rhythmic ringing signal at frequency F and the continuous ringing supervisory signal at frequency F′ generated by common oscillator 62. It will be assumed here that the subscriber set is provided with a bell system which can be energized by the audio frequency signal F at a rather small power level, of the order of a few milliwatts. The called subscriber is thus rung and his caller receives the audio frequency F which is transmitted through the chain as a call-return frequency. Simultaneously, as has been seen above, his trunk line equipment detects the continuous frequency F′ for call return supervision which is not audible but is also transmitted through the chain which has been established.

When the called subscriber lifts his handset, he causes the blocking of coincidence circuit 125 as a result of the increase of potential of point 414. The cessation of the detection of the loop frequency signal thus causes the removal of the steady voltage applied to wire 56 by detector 55 and this interruption is converted by device 63 into the form of a pulse which returns trigger circuit 58 to its rest condition, closing gate 60 and consequently stopping the transmission of the frequencies F and F′.

As during the emission of the frequency F′ detector 65 of the same trunk line equipment was applying a steady voltage to conductor 66, it is necessary to take precautions to prevent gate 67 being reopened too soon after the closing of gate 60 at the moment of triggering of 58. For the purpose a slight delay is included in the opening of gate 67.

During the period of the call all the devices utilised are in the condition of rest with the exception of the crosspoints in the chain which has been established.

The freeing of the portion of the chain situated between the subscriber's line and junctor 43 when the subscriber replaces his handset takes place as has been indicated above.

Diodes 431 and 430 have for their purpose to ensure that when a crosspoint 13 is brought into operation a rapid rise of potential of point 402 takes place and also when a disconnection takes place to prevent capacitor 432 from shunting a part of the disconnection signal. In the rest condition, diode 430 is unblocked and diode 431 is blocked. Capacitor 432 is charged to a certain voltage. When a crosspoint is brought into operation, the potential of point 402 increases again. When this increase reaches a certain value, diode 431 unblocks and diode 430 blocks because the charge of condenser 432 cannot change instantaneously. The potential of 402 stabilises at a certain value: then capacitor 432 charges progressively and after a given time (4 milliseconds for example) 431 and 430 are both unblocked to pass the speech currents or the loop frequency signal.

Certain parts of the concentrator such as decoders or scanning devices 54 and 74 identification pulse generator 88 and subscriber-identification pulse distributors 23 and 18 are not described in detail in the present specification. They are already known in the prior art, in particular in the above-mentioned application of October 4, 1957.

The concentrator which forms the subject of the present invention has been described in the present specification in the form of the particular embodiment. It will be understood, however, that numerous variations are possible, particularly in the choice of the circuits which are utilised. These variations, which will be apparent to one skilled in the art, fall within the scope of the invention.

What we claim is:

1. A telephone line concentrator for allowing a number of telephone subscribers' lines to be connected to a central station by a smaller number of trunk lines than subscribers' lines comprising a rectangular matrix of crosspoints having as many input rows as subscribers' lines connected to the concentrator, as many outgoing columns as trunk lines between the concentrator and the central station and crosspoints constituted by cold-cathode gas tubes between said rows and columns, and responsive to switching pulses applied to said input rows, at least two control lines between the concentrator and the central station, the first of said control lines carrying synchro-pulses and the second of said control lines carrying called line switching pulses, a subscribers' identification pulse distributor controlled by said synchro-pulses and having an input connected to said first control line and as many outputs as subscribers' lines, means responsive to the closing of each subscribers' line, a plurality of subscribers' gate circuits each operatively connected to a given subscriber's line, said subscriber gate circuit comprising a first and a second coincidence gate circuit the outputs of which are connected in parallel to one of said input rows of said matrix of crosspoints, said first coincidence gate circuit applying to said input row of said matrix a switching pulse effective to operate a crosspoint connecting a given subscriber's line to a trunk line in response to the coincidence of the given subscriber's identification pulse received from the said subscriber's identification pulse distributor with a signal provided by said means responsive to the closing of the given subscriber's line when the same given subscriber is calling and said second coincidence gate circuit applying to said input row of said matrix a switching pulse effective to operate a crosspoint connecting said given subscriber's line to a trunk line in response to the coincidence of the given subscriber's identification pulse received from the said subscriber's identification pulse distributor with a called subscriber switching pulse received through said second control line when said given subscriber is called.

2. A telephone line concentrator for allowing a number of telephone subscribers' lines to be connected to a central station by a smaller number of trunk lines than subscribers' lines comprising a rectangular matrix of crosspoints having as many input rows as subscribers' lines connected to the concentrator, as many outgoing columns as trunk lines between the concentrator and the central station and crosspoints constituted by cold-cathode gas tubes between said rows and columns, and responsive to switching pulses applied to said input rows, at least three control lines between the concentrator and the central station, the first of said control lines carrying synchro-pulses, the second of said control lines carrying called line switching pulses and the third of said control lines carrying a loop frequency signal, a subscriber's identification pulse distributor controlled by said synchro-pulses and having an input connected to said first control line and as many outputs as subscribers' lines, first means responsive to the closing of each subscriber's line, second means responive to the firing of a crosspoint connected to a given input of said matrix of crosspoints, a plurality of subscribers' gate circuits each operatively connected to a given subscriber's line, said subscribers' gate circuits comprising a first and a second coincidence gate circuit each the outputs of which are connected in parallel to a given input row of said matrix and each providing switching pulses effective to operate a crosspoint connecting said given subscriber's line to a trunk line and a third coincidence gate circuit with an inhibiting input connected to said first responsive means, said first gate coincidence circuit being responsive to the coincidence of the given subscriber's identification pulse received from said pulse distributor with the signal delivered by said first means after closing the given subscriber's line when the same given subscriber is calling, said second gate coincidence circuit being responsive to coincidence of the given subscriber's identification pulse received from said pulse distributor with the switching pulse received from calling said given subscriber through said second control line and said third coincidence gate circuit applying said loop frequency signal received through said third control line to said given input of said matrix in response to the reception of a signal from said second responsive means and during the absence of reception of any signal from said first responsive means whereby the loop frequency signal is allowed to pass on the trunk line to the center station when the loop of a connected subscriber's line is open.

3. A telephone line concentrator for allowing a number of telephone subscribers' lines to be connected to a central station by a smaller number of trunk lines than subscribers' lines comprising a rectangular matrix of crosspoints having as many input rows as subscribers' lines connected to the concentrator, as many outgoing columns as trunk lines between the concentrator and the central station and crosspoints constituted by cold cathode gas tubes between said rows and columns, and responsive to switching pulses applied to said input rows, at least three control lines between the concentrator and the central station, the first of said control lines carrying synchro-pulses, the second of said control lines carrying called line switching pulses and the third of said control lines carrying a loop frequency signal, a subscriber's identification pulse distributor controlled by said synchro-pulses and having an input connected to said first control line and as many outputs as subscribers' lines, first means responsive to the closing of each subscriber's line, second means responsive to the firing of a crosspoint connected to a given input of said matrix of crosspoints, a plurality of subscribers' gate circuits each operatively connected to a given subscriber's line, said subscribers' gate circuits comprising an inhibiting gate circuit, a first coincidence gate circuit, a second coincidence gate circuit and a third coincidence gate circuit, said inhibiting gate circuit preventing the transmission of said given subscriber's identification pulse from said distributor to said first and second coincidence gate circuits in response to a signal of said second responsive means from a connected subscriber's gate, said first and second coincidence gate circuits the outputs of which are connected in parallel to a given input row of said matrix of crosspoints and each providing switching pulses effective to operate a crosspoint connecting said given subscriber's line to a trunk line, said first coincidence gate circuit being responsive to the closing of a given subscriber's line when the same given subscriber is calling in response to the coincidence of the given subscriber's identification pulse received through the said inhibiting gate with a signal delivered by said first means, said second coincidence gate circuit being responsive to the coincidence of the given subscriber's identification pulse received through said inhibiting gate with a called subscriber switching pulse received through said second control line when said given subscriber is called, and said third coincidence gate circuit applying said loop frequency signal received through said third control line to said given input of said matrix of crosspoints in response to the reception of a signal from said second responsive means during the absence of reception of any signal from said first responsive means whereby the loop frequency signal is allowed to pass on the trunk line to the central station when the loop of a connected subscriber's line is open.

4. A telephone line concentrator for allowing a number of telephone subscribers' lines to be connected to a central station by a smaller number of trunk lines than subscribers' lines comprising a matrix of crosspoints having as many inputs as subscribers' lines connected to the concentrator and as many outgoing leads as trunk lines between the concentrator and the central station, at least two control lines between the concentrator and the central station, the first of said control lines carrying synchro-pulses, and the second of said control lines carrying called line switching pulses, a subscriber's identification pulse distributor controlled by said synchro-pulses and having an input circuit connected to said first control line and as many output circuits as subscribers' lines, means responsive to the closing of each subscriber's line, a plurality of subscribers' gate circuit means each operatively connected to a given subscriber's line and each having an output connected to an input of said matrix of crosspoints and at least three input circuits for controlling each of said circuit means, the first input circuit being connected to an output circuit of said distributor, the second input circuit being connected to said second control line and the third input circuit being connected to said means responsive to closing each subscriber's line whereby a given subscriber's gate circuit means connects said given subscriber's line to a trunk line at the time of signalling by said given subscriber's identification pulse when the same given subscriber is calling and said last named circuit means also connecting upon the signalling of the switching pulse of the control line of said given subscriber when the given subscriber is called.

References Cited in the file of this patent

UNITED STATES PATENTS

| | | |
|---|---|---|
| 2,812,385 | Joel et al. | Nov. 5, 1957 |
| 2,925,473 | Lucas | Feb. 16, 1960 |